(12) United States Patent
Viereck et al.

(10) Patent No.: US 11,673,607 B2
(45) Date of Patent: Jun. 13, 2023

(54) REAR AXLE SUPPORTING FRAME COMPRISING A MOUNTING DEVICE FOR A DRIVE UNIT

(71) Applicant: VOLKSWAGEN AKTIENGESELLSCHAFT, Wolfsburg (DE)

(72) Inventors: Wolfgang Viereck, Isenbüttel (DE); Wolfram Halupka, Uehrde/Warle (DE); Bert Diedrichs, Gifhorn (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/762,166

(22) PCT Filed: Oct. 29, 2018

(86) PCT No.: PCT/EP2018/079590
§ 371 (c)(1),
(2) Date: May 7, 2020

(87) PCT Pub. No.: WO2019/091814
PCT Pub. Date: May 16, 2019

(65) Prior Publication Data
US 2020/0353982 A1  Nov. 12, 2020

(30) Foreign Application Priority Data
Nov. 10, 2017  (DE) .......................... 10 2017 220 096

(51) Int. Cl.
*B62D 21/11*   (2006.01)
*B60K 1/00*   (2006.01)

(52) U.S. Cl.
CPC ................ *B62D 21/11* (2013.01); *B60K 1/00* (2013.01); *B60K 2001/001* (2013.01)

(58) Field of Classification Search
CPC ........ B62D 21/11; B60K 1/00; B60K 5/1208; B60K 2001/001
See application file for complete search history.

(56) References Cited

U.S. PATENT DOCUMENTS 5,074,374 A   12/1991   Ohtake et al.
6,511,096 B1   1/2003   Kunert et al.
(Continued)

FOREIGN PATENT DOCUMENTS

CN  106394686 A   2/2017
CN  106536331 A   3/2017
(Continued)

OTHER PUBLICATIONS

Keller et al., Bearing Arrangement and Axle Carrier for a Motor Vehicle, Feb. 27, 2014, EPO, WO 2014 029 541 A1, Machine Translation of Description (Year: 2014).*

(Continued)

*Primary Examiner* — James A English
(74) *Attorney, Agent, or Firm* — Barnes & Thornburg, LLP (57) ABSTRACT

A rear axle supporting frame for mounting a drive unit of a transportation vehicle including a first longitudinal beam and a second longitudinal which extend substantially along a longitudinal vehicle axis, as well as a first cross-beam and a second cross-beam which extend substantially along a transverse vehicle axis, the first cross-beam being located in front of the second cross-beam when viewed in a direction of travel. At least one bearing holder into which a bearing of the drive unit is pressed is provided on the rear axle supporting frame.

14 Claims, 4 Drawing Sheets

(56) References Cited

U.S. PATENT DOCUMENTS

| | | | |
|---|---|---|---|
| 7,946,377 B2 | 5/2011 | Frasch et al. | |
| 9,045,170 B2 | 6/2015 | Rumpel et al. | |
| 9,505,437 B2 | 11/2016 | Leibl | |
| 9,764,629 B2 | 9/2017 | Schmalzrieth et al. | |
| 9,802,498 B2 | 10/2017 | Isakiewitsch | |
| 10,071,766 B2 | 9/2018 | Chapple et al. | |
| 10,118,476 B2 | 11/2018 | Bujak et al. | |
| 10,179,609 B2 | 1/2019 | Stenzenberger et al. | |
| 2014/0300040 A1* | 10/2014 | Tarnawsky | B62D 21/11 267/292 |
| 2017/0174065 A1* | 6/2017 | Bujak | B62D 21/11 |
| 2018/0346030 A1* | 12/2018 | Bauer | B62D 7/226 |
| 2019/0193546 A1* | 6/2019 | Kraft | B60G 21/0551 |

FOREIGN PATENT DOCUMENTS

| | | | |
|---|---|---|---|
| CN | 106995009 A | 8/2017 | |
| DE | 2440494 A1 | 3/1975 | |
| DE | 4025031 A1 | 2/1991 | |
| DE | 19922800 A1 * | 11/1999 | B62D 27/02 |
| DE | 19909945 C1 | 10/2000 | |
| DE | 10021044 A1 * | 11/2000 | B60K 1/00 |
| DE | 102008057196 A1 | 7/2009 | |
| DE | 102011112053 A1 * | 3/2012 | B62D 21/11 |
| DE | 102012021562 A1 | 5/2014 | |
| DE | 102013007458 A1 | 10/2014 | |
| DE | 102013020565 B3 | 11/2014 | |
| DE | 102013210576 A1 | 12/2014 | |
| DE | 102014220312 A1 * | 4/2016 | B62D 21/11 |
| DE | 102014221079 A1 * | 4/2016 | B29C 63/24 |
| DE | 102015000525 A1 | 7/2016 | |
| DE | 202012013399 U1 | 10/2016 | |
| DE | 102017002972 A1 | 10/2017 | |
| DE | 102017004132 A1 | 10/2018 | |
| EP | 1386827 A2 | 2/2004 | |
| EP | 1690779 A1 | 8/2006 | |
| EP | 2093131 A2 | 8/2009 | |
| EP | 3181390 A1 | 6/2017 | |
| KR | 19980044181 U | 9/1998 | |
| WO | 2014029541 A1 | 2/2014 | |

OTHER PUBLICATIONS

Kratz et al., Independent Wheel Suspension For Use In Suspension Subframe For Road Vehicle, Particularly Passenger Vehicle, Has Wheel Carrier And Wheel Guiding Rod, Which Is Rigidly Connected With Wheel Carrier, Mar. 8, 2012, Germany, DE 10 2011 112 053 A1, Machine Translation of Description (Year: 2012).*

Shimizu et al., Vehicle With Fuel Cell System Mounted On It, Has Bearing Positioned To Form Common Bearing That Absorbs Vibrations Of Drive Motor, Air Compressor And Air Compressor Motor, Nov. 9, 2000, EPO, DE 100 21 044 A1, Machine Translation of Description (Year: 2000).*

Search Report for International Patent Application No. PCT/EP2018/079590; dated Jan. 30, 2019.

* cited by examiner

REAR AXLE SUPPORTING FRAME COMPRISING A MOUNTING DEVICE FOR A DRIVE UNIT

PRIORITY CLAIM

This patent application is a U.S. National Phase of International Patent Application No. PCT/EP2018/079590, filed 29 Oct. 2018, which claims priority to German Patent Application No. 10 2017 220 096.0, filed 10 Nov. 2017, the disclosures of which are incorporated herein by reference in their entireties.

SUMMARY

Illustrative embodiments relate to a rear axle subframe for fastening a drive unit of a transportation vehicle.

BRIEF DESCRIPTION OF THE DRAWINGS

Disclosed embodiments will be shown in greater detail in the following text with reference to the figures. Here, the features can be essential in each case individually per se or in any desired combination. It is to be noted here that the figures have merely a descriptive character and are not intended to restrict the disclosed embodiment in any way. In the figures.

DETAILED DESCRIPTION

Rear axle subframes for fastening drive units in transportation vehicles are well known. The known rear axle subframes are configured with special fastening bearings, for example, metal/rubber bearings, which serve to decouple the movements of the drive unit relative to the body of the transportation vehicle. In the case of accelerations of the transportation vehicle, for example, in the case of moving-off maneuvers or braking operations, the drive units are moved to and fro on account of their mass inertia. As a result of incorrect positioning of the fastening bearings and/or as a result of undesired tolerances between the fastening bearings and the subframe, the movements of the drive unit can be transmitted to the subframe and from the subframe to the body of the transportation vehicle. As a result, distracting noise can develop which can propagate as far as into the transportation vehicle interior compartment. Therefore, it is important in the case of the mounting of the drive units for possible movements of the drive unit to be absorbed in a targeted manner and for the propagation thereof to the subframe to be prevented. Moreover, the mounting of the drive unit has an influence on driving safety, on driving comfort and on the service life of chassis, bearing and transportation vehicle body components.

Therefore, disclosed embodiments at least partially overcome at least one drawback which is known from the prior art. In particular, disclosed embodiments provide a rear axle subframe for fastening a drive unit of a transportation vehicle which rear axle subframe has a simple and compact construction and is suitable to absorb and to reduce the movements of the drive unit in a targeted manner. Furthermore, disclosed embodiments provide a rear axle subframe for fastening a drive unit of a transportation vehicle with a bearing such that it decouples the drive unit in terms of vibrations from the transportation vehicle body in a beneficial way.

The above is achieved by way of a rear axle subframe for fastening a drive unit of a transportation vehicle. Features which are disclosed with respect to the individual exemplary embodiments of the disclosed rear axle subframe can be combined with one another in such a way that reference is or can be made at all times mutually with regard to the disclosure with respect to the disclosed embodiments.

The disclosed embodiments provide a rear axle subframe for fastening a drive unit of a transportation vehicle, having a first longitudinal carrier and a second longitudinal carrier which are oriented substantially along a transportation vehicle longitudinal axis, a first crossmember and a second crossmember which are oriented substantially along a transportation vehicle transverse axis, the first crossmember being arranged in front of the second crossmember as viewed in a driving direction. To this end, it is provided that at least one bearing seat is provided on the rear axle subframe, into which bearing seat a bearing of the drive unit is pressed. It can be provided, in particular, that three bearing seats are provided on the rear axle subframe, of which two can be arranged at the front and one can be arranged at the rear, in each case one bearing of the drive unit being pressed into each bearing seat.

A disclosed drive unit can be an electric drive unit which serves as a main drive and which is configured with an electric motor and a transmission. A disclosed transportation vehicle can be an electric transportation vehicle, in which the drive unit is installed in the rear. The disclosed rear axle subframe can form a frame-like subframe.

Here, the concept of the disclosed embodiments lies in the fact that at least one, optionally all and, in particular, three, bearings, among them, for example, two front or motor-side and one rear or transmission-side bearing, is/are pressed directly into the rear axle subframe. Here, tubular sections or bores in the rear axle subframe can serve as bearing seats. The tubular sections may be fastened to the rear axle subframe in an integrally joined manner. The bores can be made, for example, punched or deep-drawn, directly in the rear axle subframe. This can therefore ensure that the bearings are received without play in the bearing seats on the rear axle subframe. As a result of the bearings being received in a play-free manner, no relative movements occur between the bearings and the rear axle subframe. Therefore, the vibrations of the drive unit can be absorbed almost completely in the bearings. By way of play-free receiving of the bearings in this way, screwing of the bearings to the auxiliary frame, which screwing is subject to tolerances and is often possible only via additional fastening methods or mechanisms, such as supports, adapters, brackets or flanges, is no longer required. Space-saving locating of the bearings can be performed without additional fastening methods or mechanisms. The installation space which is freed up can then be utilized for the design and/or dimensioning of the bearings. Bearings of relatively large design can absorb relatively large forces and can compensate for the movements of the drive unit relative to the subframe virtually completely. Tolerances between the bearings, the individual fastening method or mechanism and the drive unit, which tolerances can contribute to the propagation of the distracting noise, are additionally dispensed with without additional fastening methods or mechanisms. Furthermore, play-free receiving of the bearings leads to improved rigidity of the rear axle subframe. This has the benefit of an improved introduction of force between the drive unit and the bearing. Furthermore, it is particularly beneficial that all the bearings can be arranged on an identical coordinate on a transportation vehicle vertical axis. This in turn has the benefit that the acoustics can be improved, and/or that the propagation of distracting noise from the drive unit to the transportation vehicle body can be prevented efficiently. Another benefit of a bearing system at an identical level consists in that the loading of the bearings is homogenized, as a result of which the vibration behavior is influenced in a positive manner. The transmission-side bearing can be oriented in parallel to the transportation vehicle longitudinal axis by way of rotation of the front two motor-side bearings parallel to the transportation vehicle transverse axis. Therefore, the vibrations of the drive unit about the transportation vehicle transverse axis can be counteracted, which vibrations can typically be produced in the case of a transverse mounting of the drive unit. By way of an orientation of this type of the bearings, stops in the transportation vehicle longitudinal axis on the transmission-side bearing can even be dispensed with. By way of play-free receiving of the bearings, moreover, simple positioning of the bearings on the rear axle subframe can be made possible. As a result, the assembly of the drive unit on the rear axle subframe is simplified and requires less time. Moreover, the drive unit can already be installed in the rear axle subframe during preassembly, optionally with corresponding preliminary wiring and pipework. The rear axle subframe can therefore be mounted on the transportation vehicle as a complete structural unit with the attached drive unit. As a result, the assembly of the transportation vehicle is simplified and is carried out more rapidly.

Moreover, in the case of a rear axle subframe, the disclosed embodiments can provide that the at least one bearing seat is of sleeve-like configuration as a bearing bush. A bearing seat of this type is simple to produce, whether separately or together with the rear axle subframe, and is simple to mount, for example, in an integrally joined manner by way of welding on the rear axle subframe if the bearing seat is provided separately. A separate bearing seat can be beneficial, to retrofit rear axle subframes which already exist. Moreover, a separate bearing seat can be beneficial, for it to be possible for the position of the bearing seat, for example, the height of the bearing seat, to be set in a flexible manner. A bearing which is configured, for example, formed, together with the rear axle subframe can in turn considerably simplify the assembly of the rear axle subframe.

Furthermore, in the case of a rear axle subframe, the disclosed embodiments can provide that the bearing is configured as a metal/rubber bearing or a spring bearing, in particular, a leaf spring bearing. The rubber or the spring within the bearings can serve to damp vibrations. In the case of the bearings, moreover, it is conceivable that there can be defined stops on the bearings in the vibration absorbing direction.

Furthermore, the disclosed embodiments can provide three bearing seats for a three-point bearing system of the drive unit. A plane can be formed by way of a three-point bearing system, in which plane vibrations of the drive unit can be absorbed in every direction, which runs through in each case two bearings. Moreover, oscillating movements can be absorbed by way of a three-point bearing system about each direction which runs through in each case two bearings. Here, the bearings do not necessarily have to be positioned without tolerances at exact points, since three points always form a plane. Said plane may lie in the horizontal plane. In the case of the three-point bearing system within the context of the disclosure, furthermore, it is conceivable that two, for example, motor-side, bearings are arranged on the first or front crossmember, and one, for example, transmission-side, bearing is arranged on the second or rear crossmember. As a result, oscillating movements of the drive unit about a transportation vehicle transverse axis, or about the axis which runs through the two front bearings, can be absorbed by way of the rear bearing, in particular, in the case of moving-off maneuvers. This can be beneficial in the case of transverse mounting of the motor.

Moreover, it is conceivable within the context of the disclosure that the bearing seats are arranged substantially at an identical level with regard to a transportation vehicle vertical axis on the rear axle subframe. Therefore, the vibration behavior of the drive unit can be predicted more simply, and the vibrations of the drive unit can be redirected to the bearings efficiently. Moreover, a homogeneous weight distribution of the drive unit to the bearings is possible as a result.

In addition, in the case of a rear axle subframe, the disclosed embodiments can provide that two bearing seats for supporting an electric motor of the drive unit are provided on the first crossmember and/or in each case one longitudinal carrier. Therefore, the weight can be supported on the motor side of the drive unit in a beneficial way, to be precise, in particular, where the rear axle subframe is of most rigid design.

Furthermore, it is conceivable that two bearing seats for supporting an electric motor of the drive unit are oriented along a transportation vehicle transverse axis. Therefore, the stops of the bearings on the motor side can be used to compensate for the vibrations of the drive unit along the transportation vehicle longitudinal axis, with the result that the bearing on the transmission side of the drive unit, which bearing can be oriented in the driving direction, can be configured without stops in the transportation vehicle longitudinal axis.

Furthermore, in the case of a rear axle subframe, the disclosed embodiments can provide that two bearing seats for supporting an electric motor of the drive unit are fastened, for example, welded, to the rear axle subframe in an integrally joined manner. Therefore, fastening tolerances between the bearing seats and the rear axle subframe can be avoided.

Furthermore, in the case of a rear axle subframe, the disclosed embodiments can provide that two bearing seats for supporting an electric motor of the drive unit are fastened to a transportation vehicle body at the same level as (with regard to a transportation vehicle vertical axis) and adjacently with respect to fastening bushes of the rear axle subframe. Therefore, the distribution of forces between the rear axle subframe and the transportation vehicle body, for example, as a consequence of speed changes, such as in the case of moving-off maneuvers or braking operations, or even in the case of a crash, can be improved.

Moreover, the disclosed embodiments can provide a bearing seat for supporting a transmission of the drive unit on a second crossmember, the bearing seat being oriented along a transportation vehicle longitudinal axis. Therefore, the bearing seat can be configured directly within the crossmember, for example, as a bore or a tubular insert.

In addition, it is conceivable that a bearing seat for supporting a transmission of the drive unit is formed in the second crossmember. Therefore, the construction of the rear axle subframe can be of compact configuration and can be simplified.

Furthermore, in the case of a rear axle subframe, the disclosed embodiments can provide that a bearing seat, for supporting a transmission of the drive unit, and the second crossmember are formed as a combined component by way of a forming process. Here, it is conceivable that the combined component is configured by way of deep-drawing and/or bending from a metal sheet. In addition, a support can be provided between the bearing seat, with the bearing which is pressed into it, and the drive unit, for the bearing to be positioned as centrally as possible in the transportation vehicle transverse axis with regard to the two front bearings. As a result, oscillating movements of the drive unit about the transportation vehicle transverse axis which are usually brought about by way of accelerations of the transportation vehicle can be absorbed by way of the bearings in a beneficial way.

In the following figures, the identical designations are used for the identical technical features even of different exemplary embodiments.

Figure 4:
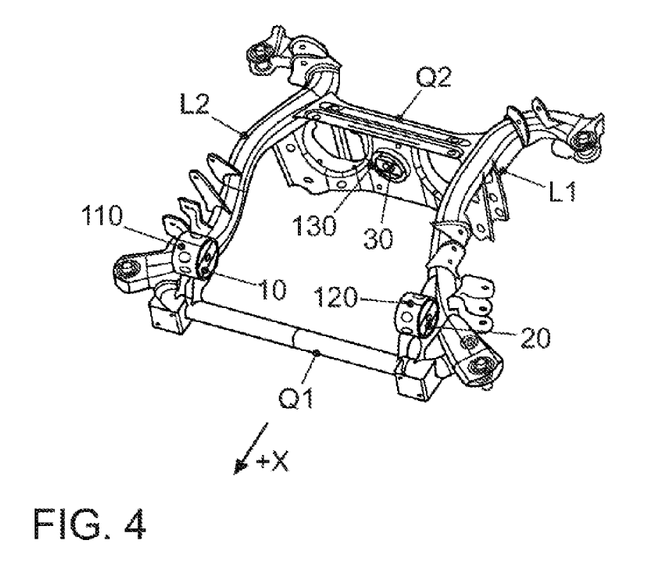
FIG. 4 shows a perspective illustration of an exemplary rear axle subframe on its own.
Figure 5:
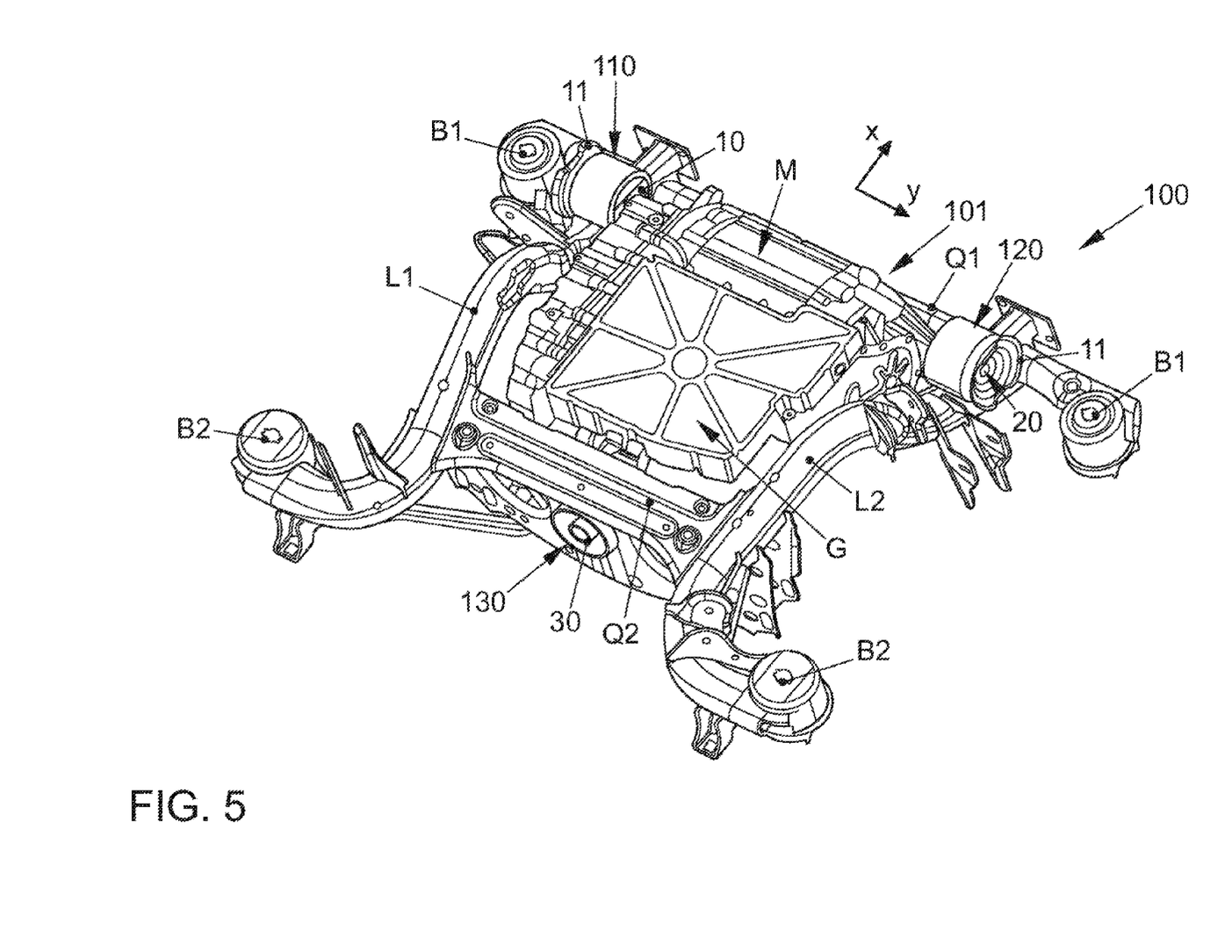
FIG. 5 shows a perspective illustration of an exemplary front axle auxiliary frame with a drive unit.
Figure 6:
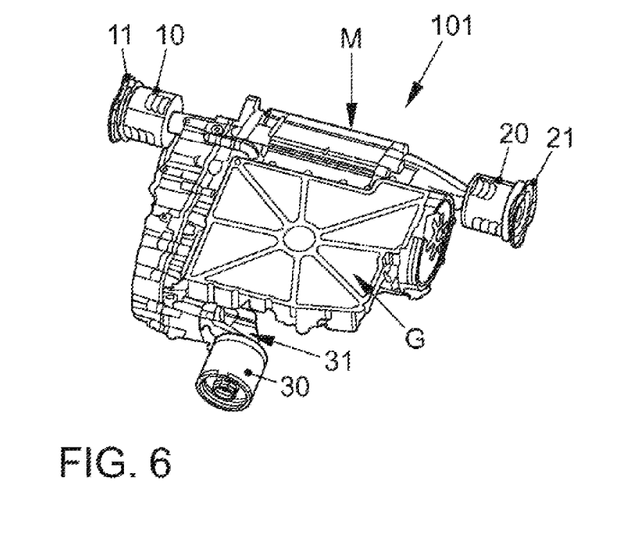
FIG. 6 shows a perspective illustration of a drive unit.
Figure 7:
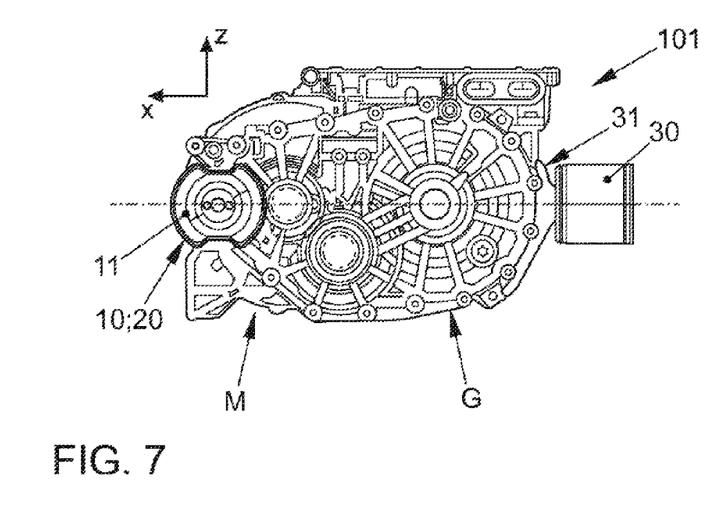
FIG. 7 shows a side view of a drive unit.

FIGS. 1 to 3 and 5 show different views of a rear axle subframe 100 within the context of the disclosure, which serves to fasten a drive unit 101 of a transportation vehicle, the drive unit 101 being shown on its own in two different views in FIGS. 6 and 7. FIG. 4 shows the disclosed rear axle subframe 100 without the drive unit 101.

As can be seen from FIGS. 1 to 5, the rear axle subframe 100 has a first longitudinal carrier L1 and a second longitudinal carrier L2 which are oriented substantially along a transportation vehicle longitudinal axis x. In addition, the rear axle subframe 100 has a first crossmember Q1 and a second crossmember Q2 which are oriented substantially along a transportation vehicle transverse axis y, the first crossmember Q1 being arranged in front of the second crossmember Q2 as viewed in a driving direction +x.

The disclosed drive unit 101 may serve as a main drive of the transportation vehicle, which main drive is installed in the rear of the transportation vehicle and has an electric motor M and a transmission G. As a consequence, a disclosed transportation vehicle may be an electric transportation vehicle. The entire transportation vehicle is not shown in the figures for reasons of simplicity.

Figure 1:
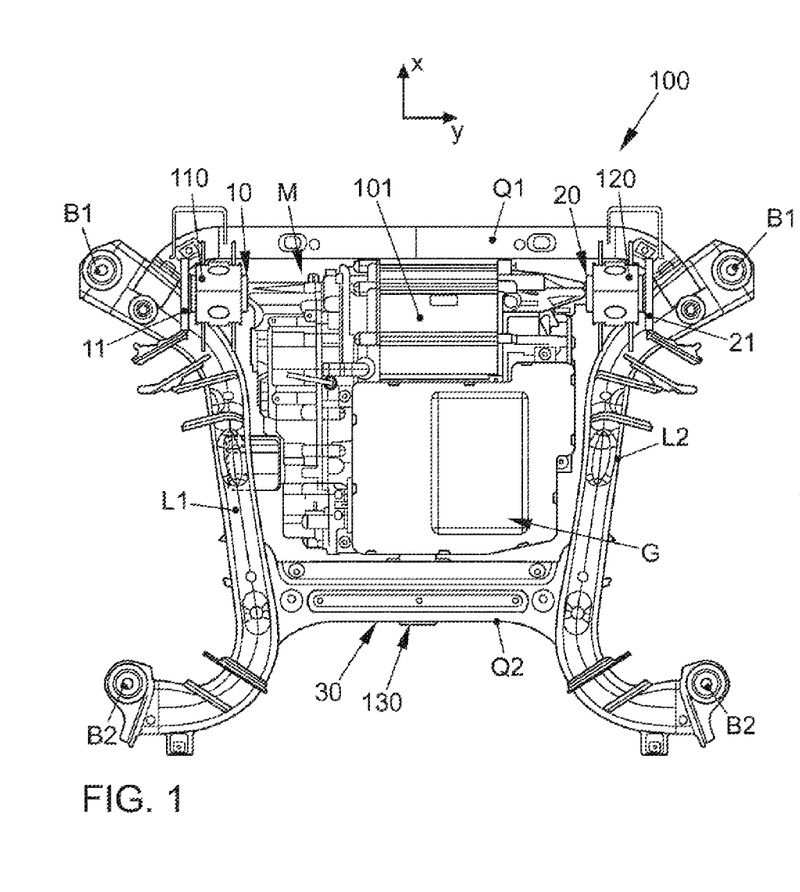
FIG. 1 shows a view of an exemplary rear axle subframe with a drive unit from above.

The concept of the disclosure is illustrated in FIGS. 1, 4 and 5, according to which at least one bearing seat 110, 120, 130 is provided on the rear axle subframe 100, into which bearing seat 110, 120, 130 a bearing 10, 20, 30 of the drive unit 101 is pressed. Three bearing seats 110, 120, 130 within the context of the disclosure may be provided on the rear axle subframe 100, of which two bearing seats 110, 120 are arranged at the front on the first crossmember Q1 as viewed in the driving direction +x and one bearing seat 130 is arranged at the rear on the second crossmember Q2, in each case one bearing 10, 20, 30 of the drive unit 101 being pressed into each of the three bearing seats 110, 120, 130.

Therefore, the bearings 10, 20, 30 can be received without play in the bearing seats 110, 120, 130 on the rear axle subframe 100, as a result of which relative movements between the bearings 10, 20, 30 and the bearing seats 110, 120, 130 can be avoided. Therefore, the vibrations of the drive unit 101 can be absorbed almost completely in the bearings 10, 20, 30, before they are transmitted to the rear axle subframe 100 and further to the transportation vehicle body (not shown). Furthermore, play-free receiving of the bearings 10, 20, 30 leads to an improved rigidity of the disclosed rear axle subframe 100.

Two bearing seats 110, 120 for a motor side of the drive unit 101 are welded on the rear axle subframe 100 at the front in the region between the first crossmember Q1 and the respective longitudinal carrier L1 and L2 and in a manner which adjoins the fastening bushes B1 of the rear axle subframe 100 to the body of the transportation vehicle. A bearing seat 130 for a transmission side of the drive unit 101 is provided at the rear on the second crossmember Q2, which bearing seat 130 can be formed directly as an integral constituent part of the second crossmember Q2, for example, by way of a corresponding forming process. A bearing arrangement of this type forms a three-point bearing system for the drive unit 101.

By way of a disclosed three-point bearing system, the necessity of attaching supports for the electric motor M of the drive unit 101 at the front in the region of the bearing seats 110, 120 is dispensed with. Without additional supports, space-saving locating of the front or motor-side bearings 10, 20 can be performed. The installation space which is freed up may be used for the design of the front bearings 10, 20. Without additional supports toward the motor side of the drive unit 101, in addition, tolerances between the front bearings 10, 20, the supports and the drive unit 101 are dispensed with, which tolerances can contribute to the propagation of the distracting noise as far as into the transportation vehicle interior compartment.

Figure 2:
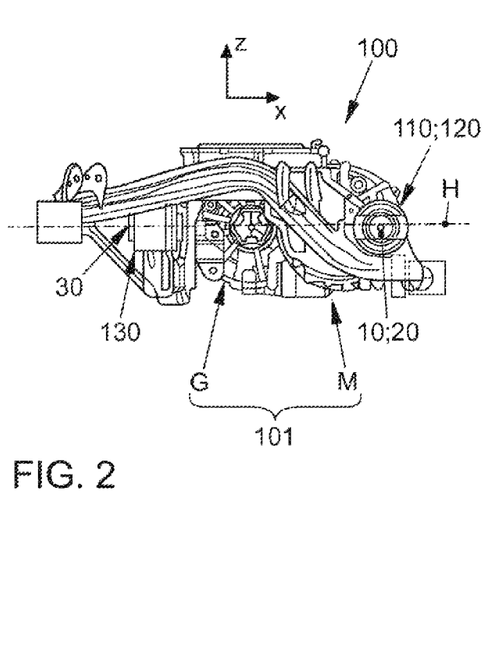
FIG. 2 shows a view of an exemplary rear axle subframe with a drive unit from the side.
Figure 3:
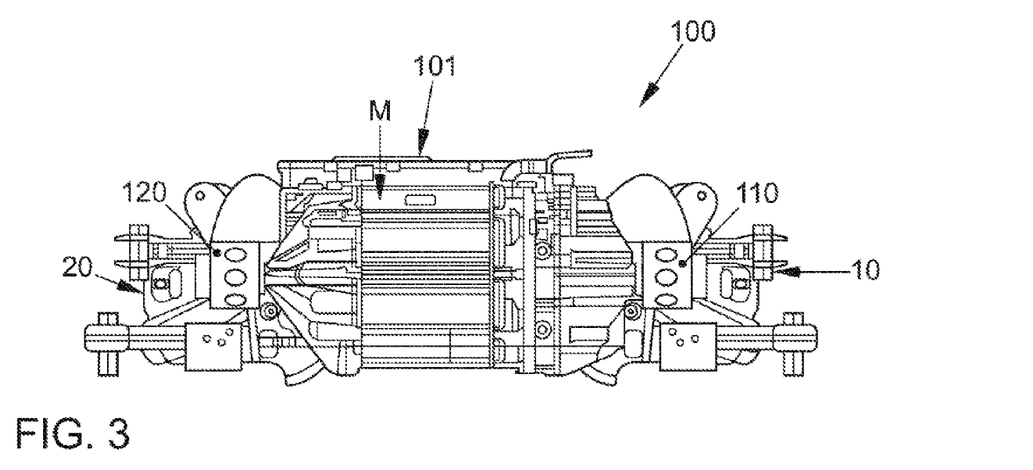
FIG. 3 shows a view of an exemplary rear axle subframe with a drive unit from the front.

As can be seen from FIG. 2, furthermore, all the bearing seats 110, 120, 130 can lie at an identical level H on a transportation vehicle vertical axis z. Therefore, the loading can be homogenized between the bearings 10, 20, 30. Moreover, the vibration behavior of the drive unit 101 relative to the rear axle subframe 100 can therefore be influenced in a positive manner.

As FIGS. 1 to 5 show, the motor-side bearing seats 110, 120 can be oriented parallel to the transportation vehicle transverse axis y, and the transmission-side bearing seat 130 can be oriented parallel to the transportation vehicle longitudinal axis x. Therefore, the vibrations of the drive unit 101 about the transportation vehicle transverse axis y can be counteracted, which vibrations can occur on a transversely mounted drive unit 101 in the case of acceleration of the transportation vehicle.

As a result of the orientation of the two front bearings 10, 20 of the drive unit 101 along the transportation vehicle transverse axis y, the two bearings 10, 20 can be screwed directly to the drive unit 101, as FIG. 6 illustrates. As a result of an orientation of this type of the front bearings 10, 20, an x-stop on the transmission-side or rear bearing 30 can even be dispensed with. The two front bearings 10, 20 of the drive unit 101 can be configured with in each case one outer stop washer 11, 21 with regard to the drive unit 101.

Furthermore, FIGS. 1 to 5 show, in different views of the rear axle subframe 100, that the bearing seats 110, 120, 130 can be of sleeve-shaped configuration, for example, as bearing bushes. Cylindrical bearings 10, 20, 30 can be fastened therein by way of pressing according to FIGS. 6 and 7.

The bearings 10, 20, 30 per se can be configured as metal/rubber bearings or spring bearings, for example, leaf spring bearings, according to FIGS. 6 and 7. As has already been mentioned above, a stop in the transportation vehicle longitudinal axis x can be dispensed with on the rear or transmission-side bearing 30. In addition, a support 31 can be provided between the transmission-side bearing seat 130 on the second crossmember Q2, with the transmission-side bearing 30 which is pressed therein, and the drive unit 101, for the bearing 30 to be positioned as centrally as possible in the transportation vehicle transverse axis y with regard to the two front bearings 10, 20. As a result, oscillating movements of the drive unit 101 about the transportation vehicle transverse axis y can be absorbed by way of the bearings 10, 20, 30 in a beneficial way. Furthermore, bearing bushes B2 with respect to the transportation vehicle body can be provided on the longitudinal carriers L1, L2 behind the second crossmember Q2.

As a result of play-free receiving of the bearings 10, 20, 30, simple positioning of the drive unit 101 on the rear axle subframe 100 can be made possible. As a result, the mounting of the drive unit 101 on the rear axle subframe 100 is simplified and accelerated. Moreover, the drive unit 101 can already be fastened to the rear axle subframe 100 during preassembly, optionally with corresponding preliminary wiring and pipework. The rear axle subframe 100 can then be mounted on the transportation vehicle as a complete structural unit with the attached drive unit 101. As a result, the assembly of the transportation vehicle is simplified considerably.

The above description of the figures describes the present disclosure exclusively within the context of examples. It goes without saying that individual features of the embodiments can be combined freely with one another, if technically appropriate, without departing from the scope of the disclosure.

LIST OF DESIGNATIONS

100 Rear axle subframe
101 Drive unit
110 Bearing seat
120 Bearing seat
130 Bearing seat
Q1 First crossmember
Q2 Second crossmember
L1 Longitudinal carrier
L2 Longitudinal carrier
10 Bearing
11 Stop washer
20 Bearing
21 Stop washer
30 Bearing
31 Support
M Electric motor
G Transmission
H Level
x Transportation vehicle longitudinal axis
y Transportation vehicle transverse axis
z Transportation vehicle vertical axis
B1 Fastening bushes
B2 Bearing bushes

The invention claimed is:

1. A rear axle subframe for fastening a drive unit of a transportation vehicle, the rear axle subframe comprising:
a first longitudinal carrier and a second longitudinal carrier oriented substantially along a transportation vehicle longitudinal axis; and
a first crossmember and a second crossmember oriented substantially along a transportation vehicle transverse axis;
wherein the first crossmember is arranged in front of the second crossmember as viewed in a driving direction,
wherein three bearing seats are provided for a three-point bearing system in which bearings of the drive unit of the drive unit are pressed, the bearing seats are arranged substantially at an identical level with regard to a transportation vehicle vertical axis on the rear axle subframe,
wherein two of the three bearing seats for supporting an electric motor of the drive unit are provided on the first crossmember and in each case one longitudinal carrier, the bearing seats being oriented along a transportation vehicle transverse axis, and
wherein a bearing seat of the three bearing seats for supporting a transmission of the drive unit is provided on a second crossmember, the bearing seat is oriented along a transportation vehicle longitudinal axis.

2. The rear axle subframe of claim 1, wherein at least one of the three bearing seats is of sleeve-shaped configuration.

3. The rear axle subframe of claim 1, wherein the bearings are a metal/rubber bearing or a spring bearing.

4. The rear axle subframe of claim 1, wherein the two of the three bearing seats for supporting an electric motor of the drive unit are integrally fastened to the rear axle subframe.

5. The rear axle subframe of claim 1, wherein the two of the three bearing seats for supporting an electric motor of the drive unit are fastened to a transportation vehicle body at the same level as the rear axle subframe with regard to a vehicle vertical axis and adjacently with respect to fastening bushes of the rear axle subframe.

6. The rear axle subframe of claim 1, wherein a bearing seat of the three bearing seats for supporting a transmission of the drive unit is formed in the second crossmember.

7. The rear axle subframe of claim 1, wherein a bearing seat of the three bearing seats, for supporting a transmission of the drive unit, and the second crossmember are formed as a combined component by way of a forming process.

8. A transportation vehicle comprising: a rear axle subframe having
a first longitudinal carrier and a second longitudinal carrier oriented substantially along a transportation vehicle longitudinal axis; and
a first crossmember and a second crossmember oriented substantially along a transportation vehicle transverse axis,
wherein the first crossmember is arranged in front of the second crossmember as viewed in a driving direction,
wherein three bearing seats are provided for a three-point bearing system in which bearings of the drive unit of the drive unit are pressed, the bearing seats are arranged substantially at an identical level with regard to a transportation vehicle vertical axis on the rear axle subframe, and
wherein two of the three bearing seats for supporting an electric motor of the drive unit are provided on the first crossmember and in each case one longitudinal carrier, the bearing seats being oriented along a transportation vehicle transverse axis,
wherein a bearing seat of the three bearing seats for supporting a transmission of the drive unit is provided on a second crossmember, the bearing seat is oriented along a transportation vehicle longitudinal axis.

9. The transportation vehicle of claim 8, wherein at least one of the three bearing seats is of sleeve-shaped configuration.

10. The transportation vehicle of claim 8, wherein the bearings are a metal/rubber bearing or a spring bearing.

11. The transportation vehicle of claim 8, wherein the two of the three bearing seats for supporting an electric motor of the drive unit are integrally fastened to the rear axle subframe.

12. The transportation vehicle of claim 8, wherein the two of the three bearing seats for supporting an electric motor of the drive unit are fastened to a transportation vehicle body at the same level as the rear axle subframe with regard to a vehicle vertical axis and adjacently with respect to fastening bushes of the rear axle subframe.

13. The transportation vehicle of claim 8, wherein a bearing seat of the three bearing seats for supporting a transmission of the drive unit is formed in the second crossmember.

14. The transportation vehicle of claim 8, wherein a bearing seat of the three bearing seats, for supporting a transmission of the drive unit, and the second cross member are formed as a combined component by way of a forming process.

\* \* \* \* \*